United States Patent
Hwao et al.

(10) Patent No.: US 7,646,956 B2
(45) Date of Patent: Jan. 12, 2010

(54) OPTICAL WAVEGUIDE SHEET AND MANUFACTURING METHOD THEREOF

(75) Inventors: Yong-Wook Hwao, Suwon-si (KR); Chang-Youn Hwang, Hwaseong-si (KR); Young-Ki Kim, Yongin-si (KR); Shin-Chul Kang, Seoul (KR); Ki-Duk Jang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/022,727

(22) Filed: Jan. 30, 2008

(65) Prior Publication Data

US 2008/0205841 A1 Aug. 28, 2008

(30) Foreign Application Priority Data

Feb. 23, 2007 (KR) .................. 10-2007-0018390

(51) Int. Cl.
*G02B 6/10* (2006.01)
*G02B 6/00* (2006.01)
*G02B 6/02* (2006.01)

(52) U.S. Cl. .................. 385/131; 385/129; 385/130; 385/14; 385/141; 264/1.24; 264/1.34; 427/163.2; 427/163.4

(58) Field of Classification Search .............. 385/14, 385/129, 130, 131, 132, 141; 427/162, 163.1, 427/163.2, 163.3, 163.4, 165, 163; 264/1.24, 264/1.34, 1.7, 1.9; 362/615, 618, 620, 627, 362/559, 560
See application file for complete search history.

(56) References Cited

U.S. PATENT DOCUMENTS

| | | | | |
|---|---|---|---|---|
| 5,026,135 A | * | 6/1991 | Booth | 385/130 |
| 5,165,005 A | * | 11/1992 | Klainer et al. | 385/129 |
| 5,861,113 A | * | 1/1999 | Choquette et al. | 264/1.24 |
| 6,033,604 A | * | 3/2000 | Lundin et al. | 264/1.24 |
| 6,563,976 B1 | * | 5/2003 | Grann et al. | 385/24 |
| 6,636,678 B1 | * | 10/2003 | Bendett et al. | 385/132 |
| 6,753,034 B2 | * | 6/2004 | Ives et al. | 427/163.2 |
| 6,829,398 B2 | * | 12/2004 | Ouchi | 385/14 |
| 6,980,721 B2 | * | 12/2005 | Ouchi | 385/50 |
| 2003/0179979 A1 | * | 9/2003 | Ouchi | 385/14 |
| 2004/0109642 A1 | * | 6/2004 | Parikka et al. | 385/37 |

FOREIGN PATENT DOCUMENTS

| | | |
|---|---|---|
| KR | 1020060071239 | 6/2006 |
| KR | 1020060090784 | 8/2006 |
| KR | 1020070000851 | 1/2007 |
| KR | 1020070014367 | 2/2007 |
| KR | 20-2007-0000276 | 3/2007 |
| KR | 100754686 | 8/2007 |

* cited by examiner

*Primary Examiner*—Brian M Healy
(74) *Attorney, Agent, or Firm*—The Farrell Law Firm, LLP (57) ABSTRACT

An optical waveguide sheet that has an auxiliary layer for preventing light transmitted through the waveguide sheet from leaking or being lost and a manufacturing method thereof. The waveguide sheet transmits light from a light emitting element thereinto, and has a reflecting pattern for reflecting light forward. At least one auxiliary layer for providing a total reflection condition for preventing the light from leaking or being lost when the light is transmitted into the waveguide sheet is coated on the waveguide sheet.

24 Claims, 8 Drawing Sheets

OPTICAL WAVEGUIDE SHEET AND MANUFACTURING METHOD THEREOF

PRIORITY

This application claims priority to an application filed in the Korean Industrial Property Office on Feb. 23, 2007 and assigned Serial No. 2007-0018390, the contents of which are hereby incorporated by reference.

BACKGROUND OF THE INVENTION

1. Field of the Invention

The present invention generally relates to an optical waveguide sheet and a manufacturing method thereof, and more particularly to an optical waveguide sheet that has an auxiliary layer for preventing light transmitted through the waveguide sheet from leaking or being lost and a manufacturing method thereof.

2. Description of the Related Art

Figure 1:
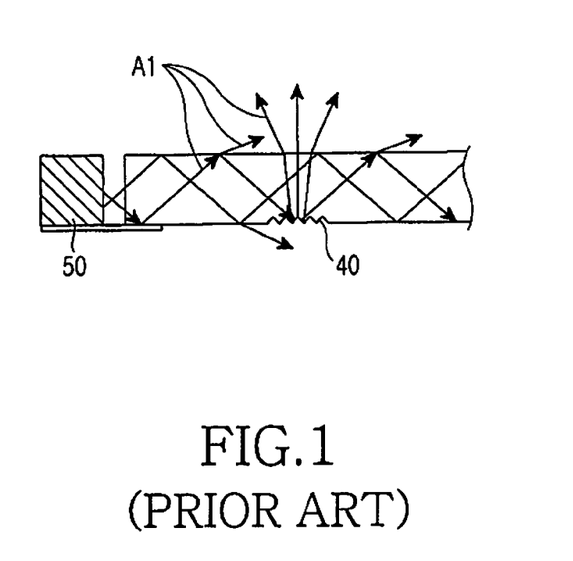
FIG. 1 is a cross sectional view of a conventional waveguide sheet illustrating traveling paths of light.
Figure 2:
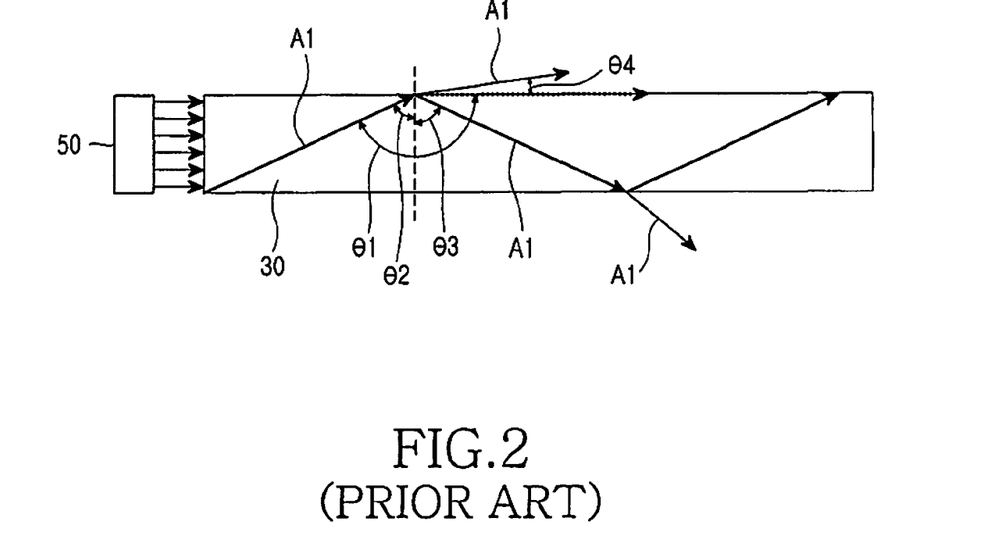
FIG. 2 is a cross sectional view of a conventional waveguide sheet illustrating light reflecting conditions.

As shown in FIGS. 1 and 2, light A1 from a light emitting element 50 as a light emitting source is introduced into and is transmitted through a conventional optical waveguide sheet 30. Then, the light is reflected by a reflecting pattern 40 formed on a backside of the waveguide sheet, and finally the reflected light exits to the outside of the waveguide sheet.

If the light A1 is introduced from the light emitting element 50 into the waveguide sheet 30, the light A1 is transmitted within the waveguide sheet 30 by total reflection. When the transmitted light A1 arrives at upper and lower boundary surfaces of the waveguide sheet 30, the light A1 is reflected or exits depending on the incident angle $\theta 2$ of the light A1. That is, the light A1 exits the waveguide sheet 30 at a refracting angle $\theta 4$ when the incident angle $\theta 2$ is larger than a critical angle $\theta 1$ at which the light is reflected in parallel to the boundary surfaces, and the light A1 is reflected back into the waveguide sheet 30 at a reflecting angle $\theta 3$ when the incident angle $\theta 2$ is smaller than the critical angle $\theta 1$.

The light A1 is reflected back on or exits from the boundary surfaces according to the above reflecting principle. Therefore, the intensity of the light A1 is weaker the longer the light A1 travels within the waveguide sheet 30.

Figure 3:
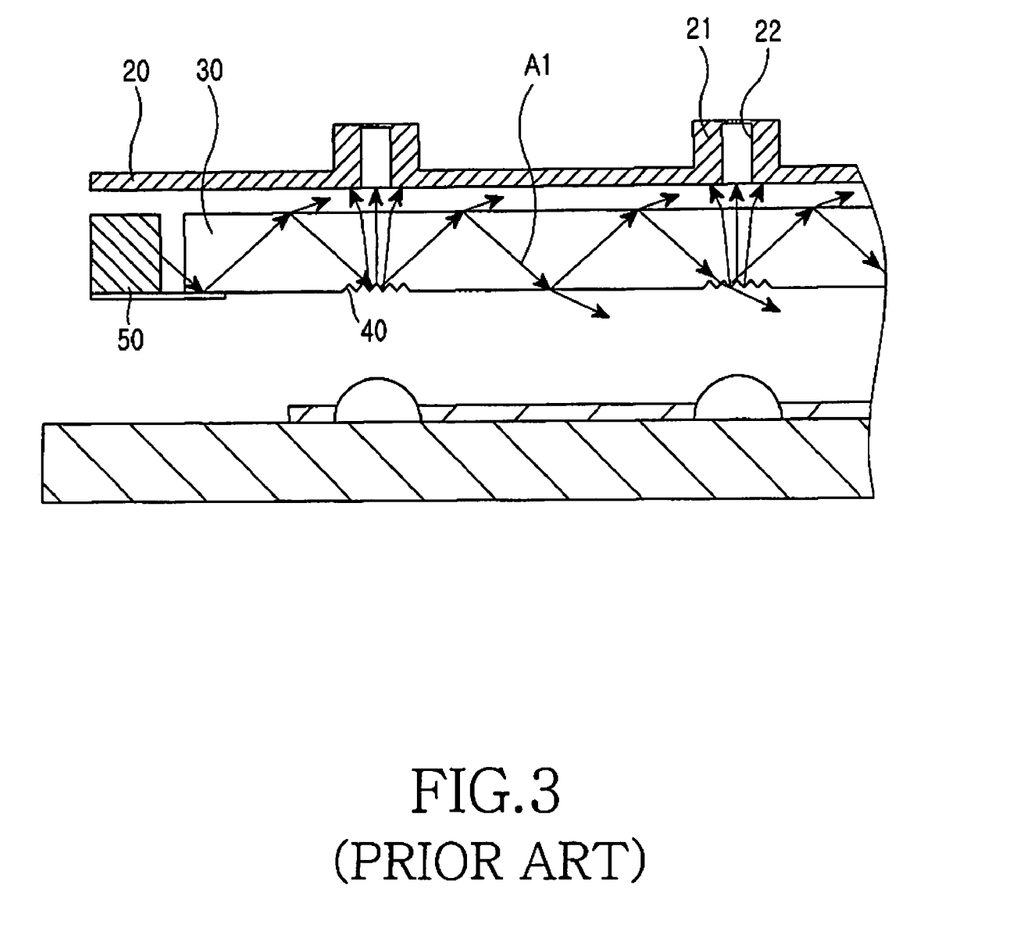
FIG. 3 is a cross sectional view of a conventional waveguide sheet illustrating leak or loss conditions of light.

FIG. 3 illustrates reflection and loss behaviors of the light A1 traveling in a conventional waveguide sheet 30 adapted in a keypad assembly. The keypad assembly includes a keypad 20 with a plurality of keys 21 having a transparent mark 22, respectively, a light emitting element 50, such as a Light Emitting Diode (LED) or the like, for emitting light A1, and an optical waveguide sheet 30 having one or more reflecting patterns 40 for scattering light A1 transmitted from the light emitting element 50 to the keys 21.

When the light A1 emitted from the light emitting element 50 is introduced into the waveguide sheet 30, the light A1 is transmitted through the waveguide sheet 30, then meets with the reflecting patterns 40 formed on the backside of the waveguide sheet 30.

The light A1 is reflected towards the keypad 20 by the reflecting patterns 40, and then exits through the transparent marks 22 formed on the keys 21, wherein the transparent marks have shapes of corresponding numbers, characters, symbols, and the like.

However, a conventional waveguide sheet has problems where light introduced from a light emitting element into the waveguide sheet leaks or is lost at boundary surfaces of the waveguide sheet.

Accordingly, the intensity of the Light A1 is weaker the longer the light A1 is transmitted within the waveguide sheet 30. Also, brightness is further reduced as the light A1 is transmitted through a longer distance from the light emitting element.

SUMMARY OF THE INVENTION

Accordingly, the present invention solves the above-mentioned problems occurring in the prior art, and provides an optical waveguide sheet and a method for manufacturing thereof, wherein an auxiliary layer is formed on the waveguide sheet to increase an efficiency of total reflection by preventing light transmitted through the waveguide sheet from leaking or being lost, such that a reflectance to the light transmitted within the waveguide sheet is increased, and the light illuminates uniformly at any location, thereby providing improved luminance and efficiency of illumination.

In accordance with an aspect of the present invention, there is provided an optical waveguide sheet for transmitting light from a light emitting element thereinto by total reflection, the waveguide sheet including a reflecting pattern for reflecting the light forward; and at least one auxiliary layer for providing a total reflection condition for preventing the light from leaking or being lost when the light is transmitted into the waveguide sheet, the auxiliary layer being coated on the waveguide sheet.

In accordance with another aspect of the present invention, there is provided an optical waveguide sheet for transmitting light from a light emitting element thereinto by total reflection, the waveguide sheet including a reflecting pattern for reflecting the light forward; and at least one auxiliary layer for providing a total reflection condition for preventing the light from leaking or being lost when the light is transmitted into the waveguide sheet, the auxiliary layer being coated on a bottom surface of the waveguide sheet.

In accordance with yet another aspect of the present invention, there is provided an optical waveguide sheet for transmitting light from a light emitting element thereinto by total reflection, the waveguide sheet including a reflecting pattern for reflecting the light forward; and at least one auxiliary layer for providing a total reflection condition for preventing the light from leaking or being lost when the light is transmitted into the waveguide sheet, the auxiliary layer being coated on a bottom surface of the waveguide sheet, wherein the auxiliary layer is removed in a position corresponding to the reflecting pattern.

In accordance with still another aspect of the present invention, there is provided an optical waveguide sheet for transmitting light from a light emitting element thereinto by total reflection, the waveguide sheet including a reflecting pattern for reflecting the light forward; and at least one auxiliary layer for providing a total reflection condition for preventing the light from leaking or being lost when the light is transmitted into the waveguide sheet, the auxiliary layer being coated on top and bottom surfaces of the waveguide sheet, wherein the auxiliary layer is removed in a position corresponding to a transparent mark provided in the waveguide sheet.

In accordance with yet another aspect of the present invention, there is provided an optical waveguide sheet for transmitting light from a light emitting element thereinto by total reflection, the waveguide sheet including a reflecting pattern for reflecting the light forward; and at least one auxiliary layer for providing a total reflection condition for preventing the light from leaking or being lost when the light is transmitted into the waveguide sheet, the auxiliary layer being coated on a top surface of the waveguide sheet, wherein the auxiliary layer is removed in a position corresponding to a transparent mark provided in the waveguide sheet.

In accordance with still another aspect of the present invention, there is provided an optical waveguide sheet for transmitting light from a light emitting element thereinto, the waveguide sheet including at least one auxiliary layer for providing a total reflection condition for preventing the light from leaking or being lost when the light is transmitted into the waveguide sheet, the auxiliary layer being coated on top and bottom surfaces of the waveguide sheet.

In accordance with yet another aspect of the present invention, there is provided a method of manufacturing an optical waveguide sheet for transmitting light from a light emitting element thereinto, which has a reflecting pattern for reflecting the light forward, the method including molding the waveguide sheet by using transparent resin; forming the reflecting pattern in the waveguide sheet; coating a first auxiliary layer for providing a total reflection condition for preventing light from leaking or being lost, on a surface of the waveguide sheet; and coating a second auxiliary layer on a surface of the first auxiliary layer to protect the first auxiliary layer, increase the reflectance of the first auxiliary layer, and thus improve the total reflection condition of the first auxiliary layer.

In accordance with still another aspect of the present invention, there is provided a method of manufacturing an optical waveguide sheet for transmitting light from a light emitting element thereinto, which has a reflecting pattern for reflecting the light forward, the method including forming the reflecting pattern while injection molding transparent resin into the waveguide sheet; coating a first auxiliary layer for providing a total reflection condition for preventing the light from leaking or being lost, on a surface of the waveguide sheet; and coating a second auxiliary layer on a surface of the first auxiliary layer to protect the first auxiliary layer, increase the reflectance of the first auxiliary layer, and thus improve the total reflection condition of the first auxiliary layer.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

Figure 4:
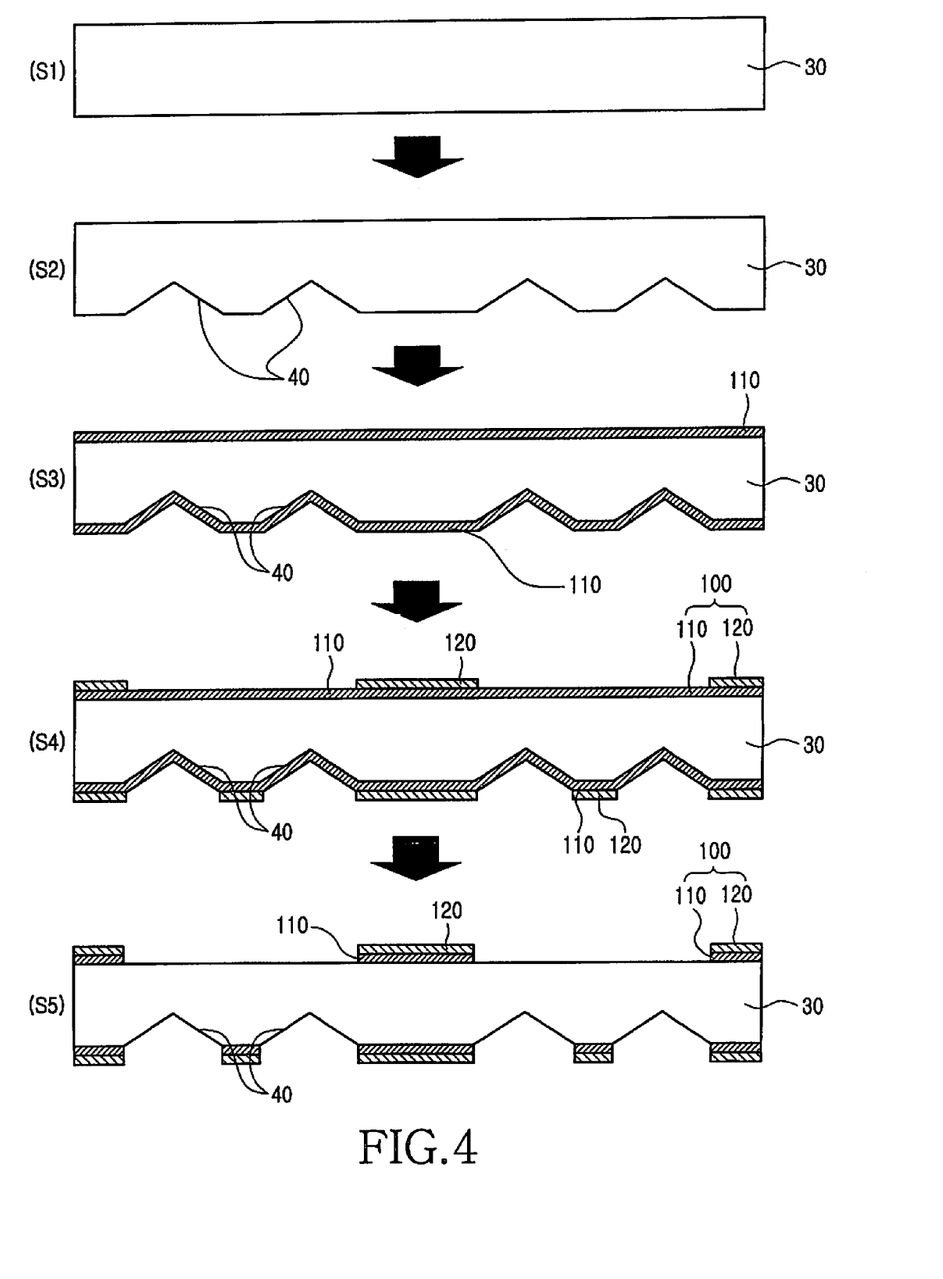
FIG. 4 is a cross sectional views of an optical waveguide sheet according to a first embodiment of the invention, illustrating a coating sequence of an auxiliary layer on the waveguide sheet.
Figure 5:
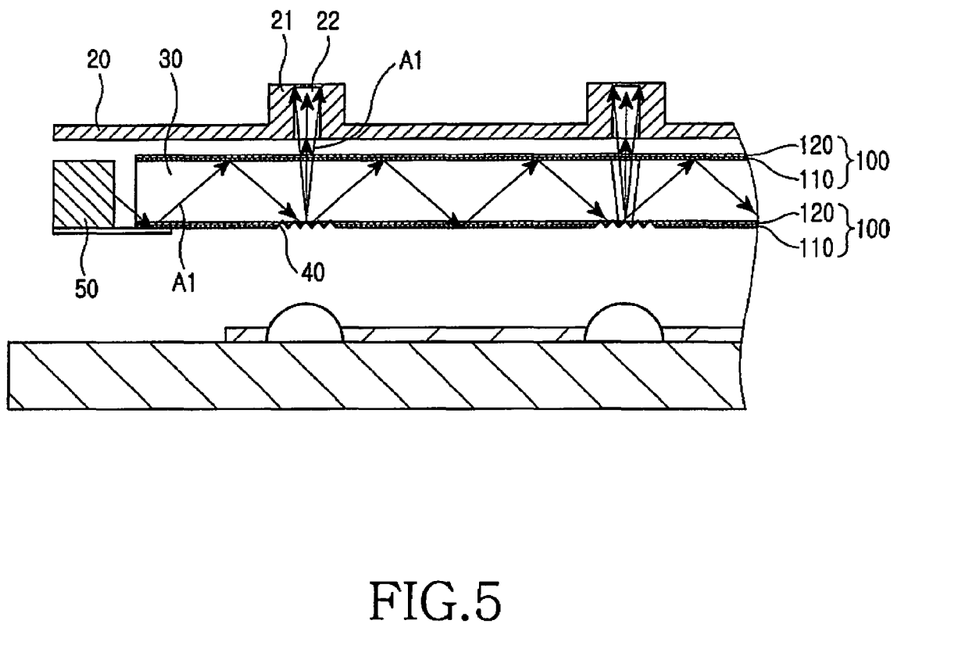
FIG. 5 is a cross sectional view of an optical waveguide sheet according to the first embodiment of the invention, the waveguide sheet having auxiliary layers coated on the upper and lower surfaces thereof being located below a keypad.
Figure 6:
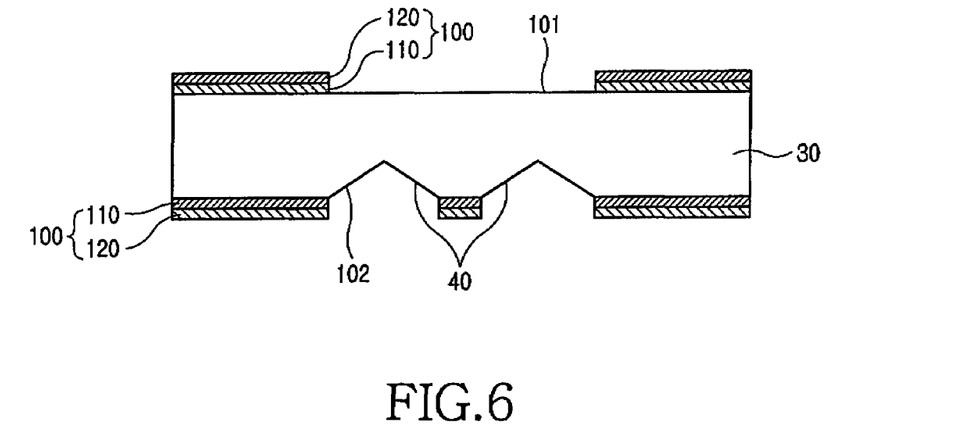
FIG. 6 is a cross sectional view of an optical waveguide sheet having auxiliary layers coated on the upper and the lower surfaces thereof according to the first embodiment of the invention, with portions of the auxiliary layers corresponding to reflecting patterns and a transparent mark being removed.

A first example of the present invention is shown in FIGS. 4 to 6, where a reflecting pattern 40 for reflecting light A1 emitted from a light emitting element 50 forward by total reflection condition is formed on a backside of an optical waveguide sheet 30.

As shown in FIGS. 4 and 5, at least one auxiliary layer 100 providing a total reflection condition for preventing light A1 transmitted through the waveguide sheet 30 from leaking or being lost is coated on the waveguide sheet 30.

The waveguide sheet 30 is formed of transparent resin to allow the light to transmit, and the transparent resin includes, for example, polycarbonate, acryl resin and polyethylene terephthalate (PET).

The auxiliary layer 100 may include a first auxiliary layer 110 and a second auxiliary layer 120. The first auxiliary layer 110 may be coated on a surface of the waveguide sheet 30 in a minimal thickness by vacuum deposition, the second auxiliary layer 120 may be coated on the first auxiliary layer 110, such that the first auxiliary layer 110 is protected, and a reflectance of the total reflection condition in the waveguide sheet 30 is maximized.

The first auxiliary layer 110 may be formed from aluminum (Al), chrome (Cr), nickel (Ni), tin (Sn), silver (Ag) and titanium (Ti), or the first auxiliary layer 110 may be formed from silicon dioxide ($SiO_2$), titanium oxide ($TiO_2$) and zirconium oxide ($ZrO_2$).

The second auxiliary layer 120 can be formed by printing, spraying, dipping, or the like, where dipping generally refers to a method for deposition and soaking. For example, in the present invention, dipping refers to soaking desired materials for coating (i.e. an optical waveguide of the present invention) in coating liquid to coat the surface. That is to say, in the present invention, dipping generally refers to a method for coating the surface of an optical waveguide sheet to give colors and thickness on the surface thereof by soaking an optical waveguide sheet coated with a first auxiliary layer in the coating liquid. Accordingly, dipping, as used herein, generally refers to soaking desired materials for coating in a coating liquid.

The first and the second auxiliary layers 110, 120 shown in FIGS. 4 to 6 are coated on upper and lower surfaces of the waveguide sheet 30.

As shown in FIG. 6, the first and the second auxiliary layers 110, 120 coated at positions 101, 102 corresponding to a transparent mark 22 and the reflecting pattern 40, respectively, are removed.

The light transmitting mechanism in the waveguide sheet as described above is more specifically described below.

As shown in FIGS. 4 to 6, the auxiliary layer 100 is coated on the upper and the lower surfaces of the waveguide sheet 30, such that leak and loss of the light A1 is prevented during the time the light A1 is transmitted within the waveguide sheet 30, and the auxiliary layer 100 includes at least one layer, the layers including the first auxiliary layer 110 and the second auxiliary layer 120.

As shown in step S3 in FIG. 4, the first auxiliary layer 110 includes metal, such as aluminum (Al), chrome (Cr), nickel (Ni), tin (Sn), silver (Ag), titanium (Ti), and the like, or includes silicon dioxide ($SiO_2$), titanium oxide ($TiO_2$), zirconium oxide ($ZrO_2$), and the like, and the first auxiliary layer 110 is coated on the upper and the lower surfaces of the waveguide sheet 30 by vacuum deposition.

The thickness of the first auxiliary layer 110 and thus the reflectance of the auxiliary layer 100 can be adjusted by selecting materials to be deposited and by controlling deposition time.

It is preferred to select materials that have high deposition efficiency and high reflectance, and to coat the materials as the first auxiliary layer 110 in a minimal thickness, so that leak and loss of light are extremely small.

As shown in step S4 in FIG. 4, the second auxiliary layer 120 is coated on the surface of the first auxiliary layer 110 by printing, spraying, dipping, or the like. In addition, the second auxiliary layer 120 is coated on the surface of the first auxiliary layer 110 in a desired color and at a desired thickness, so an improvement of the total reflection condition by the first auxiliary layer 110 within the waveguide sheet 30 can be maximized.

As shown in step S5 in FIG. 4 and FIG. 6, the first and the second auxiliary layers 110, 120 coated at positions 101, 102 corresponding to a transparent mark 22 and the reflecting pattern 40 for reflecting the light forward, respectively, are removed, so the light A1 reflecting from the reflecting pattern 40 exits through the transparent mark 22.

As shown in FIG. 5, the auxiliary layer 100 is coated on the upper and the lower surfaces of the waveguide sheet 30, and the first and the second auxiliary layers 110, 120 coated at positions 101, 102 corresponding to the transparent mark 22 and the reflecting pattern 40, respectively, are removed. Then, the waveguide sheet 30 is located below a keypad 20. When a light emitting element 50 emits light A1, the light A1 is introduced into the waveguide sheet 30 and is transmitted therein. The light A1 is reflected back into the waveguide sheet 30 on the upper and the lower boundary surfaces of the waveguide sheet 30 regardless of the incident angle of the light A1, thereby preventing leak or loss of the light A1 at the upper and the lower boundary surfaces of the waveguide sheet 30.

The light A1 is reflected forward by the reflection patterns 40 formed on the backside of the waveguide sheet 30, then exits from the waveguide sheet 30 through the positions 101 formed by removing the first and the second auxiliary layers 110, 120 to the transparent marks 22 of the keys 21.

Because of the auxiliary layer 100 coated on the upper and the lower surfaces of the waveguide sheet 30, leak or loss of the light A1 at the upper and the lower surfaces of the waveguide sheet 30 is prevented, thereby increasing brightness of the light at a distance from the light emitting element 50, uniformly transmitting the light A1 to the whole area of the keypad 20, and as a result, increasing the brightness of the light A1 introduced into the transparent marks 22.

In addition, with reference to FIG. 7, a second example of a light transmitting mechanism in an optical waveguide sheet according to the invention is more specifically described below.

Figure 7:
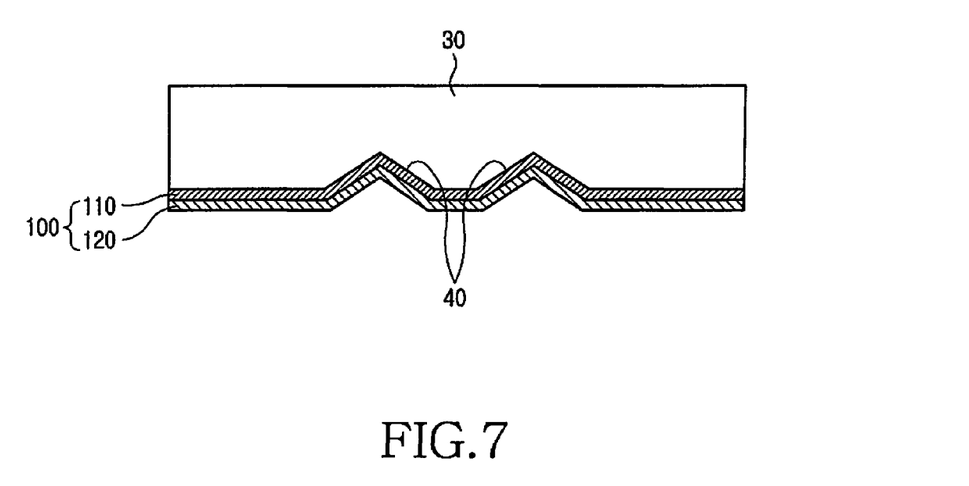
FIG. 7 is a cross sectional view of an optical waveguide sheet according to a second embodiment of the invention, the waveguide sheet having auxiliary layers on a lower surface thereof.

In FIG. 7, an auxiliary layer 100 is coated on a lower surface of an optical waveguide sheet 30, such that leak and loss of light A1 is prevented during the time the light A1 is transmitted within the waveguide sheet 30, and the auxiliary layer 100 includes a first auxiliary layer 110 and a second auxiliary layer 120.

As shown in FIG. 7, the waveguide sheet 30 having the auxiliary layer 100 on the lower surface of the sheet 30 is located below a keypad 20.

When a light emitting element 50 emits light A1, the light A1 is introduced into the waveguide sheet 30 and is transmitted therein.

The light A1 is reflected back on the lower boundary surface of the waveguide sheet 30 regardless of the incident angle of the light A1, thereby the light being reflected into and being transmitted within the waveguide sheet 30 without leak or loss of the light A1 at the lower boundary surface of the waveguide sheet 30.

In this case, the light A1 is reflected by a reflection pattern 40 formed on the backside of the waveguide sheet 30, then exits to a transparent mark 22 through the position 101 formed by removing the auxiliary layer 100 corresponding to the transparent mark 22.

Because of the auxiliary layer 100 coated on the lower surface of the waveguide sheet 30, leak or loss of the light A1 at the lower surface of the waveguide sheet 30 is prevented, thereby increasing brightness of the light at a distance from the light emitting element 50, uniformly transmitting the light A1 to the whole area of the keypad 20, and as a result, increasing the brightness of the light A1 introduced into the transparent mark 22.

The cost and the time needed to manufacture the waveguide sheet 30 can be reduced, since the auxiliary layer 100 is coated only on the lower surface of the waveguide sheet 30.

In addition, with reference to FIG. 8, a third example of a light transmitting mechanism in an optical waveguide sheet according to the invention is more specifically described below.

Figure 8:
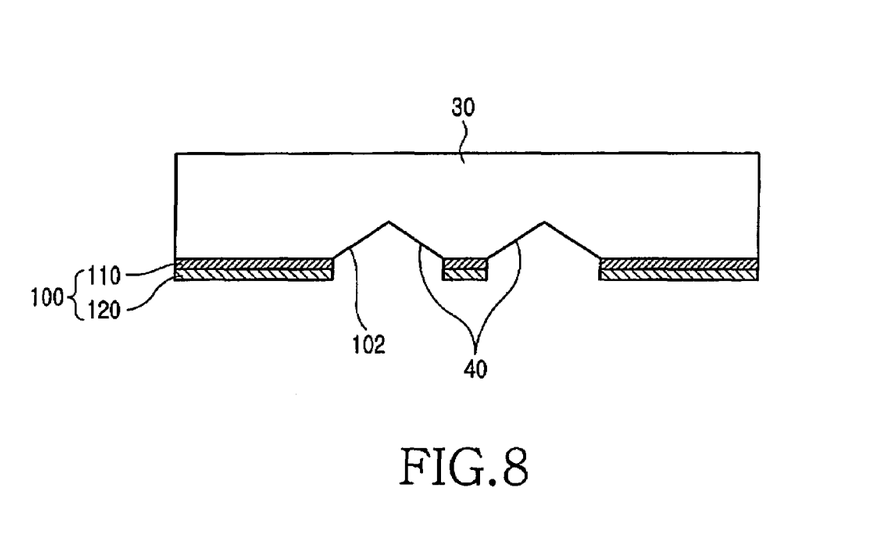
FIG. 8 is a cross sectional view of an optical waveguide sheet having auxiliary layers coated on a lower surface thereof according to a third embodiment of the invention, with the auxiliary layer coated on reflecting patterns being removed.

In FIG. 8, an auxiliary layer 100 is coated on a lower surface of an optical waveguide sheet 30, such that a total reflection condition for preventing the light A1 from leaking and being lost during the time the light A1 is transmitted within the waveguide sheet 30 is provided, and the auxiliary layer 100 formed at a position 102 corresponding to a reflecting pattern 40 is removed.

The auxiliary layer 100 includes a first auxiliary layer 110 and a second auxiliary layer 120.

The auxiliary layer 100 is coated on the lower surface of the waveguide sheet 30, and the auxiliary layer 100 coated at position 102 corresponding to the reflecting pattern 40 for reflecting the light A1 forward is removed.

The auxiliary layer 100 is coated on the lower surface of the waveguide sheet 30, the auxiliary layer 100 coated at position 102 corresponding to the reflecting pattern 40 is removed, and then the waveguide sheet 30 is located below a keypad 20.

When a light emitting element 50 emits light A1, the light A1 is introduced into the waveguide sheet 30 and is transmitted therein.

The light A1 is reflected back into the waveguide sheet 30 on the lower boundary surface of the waveguide sheet 30 regardless of the incident angle of the light A1, thereby transmitting the light A1 within the waveguide sheet 30 without leak or loss of the light A1 at the lower boundary surface of the waveguide sheet 30.

In this case, the light A1 is reflected by the reflection pattern 40 formed on the backside of the waveguide sheet 30, then exits from the waveguide sheet to a transparent mark 22 of a key 21.

Because of the auxiliary layer 100 coated on the lower surface of the waveguide sheet 30, leak or loss of the light A1 at the lower surface of the waveguide sheet 30 is prevented, thereby increasing brightness of the light at a distance from the light emitting element 50, uniformly transmitting the light A1 to the whole area of the keypad 20, and as a result, increasing the brightness of the light A1 introduced into the transparent mark 22.

The reflecting function of the reflecting pattern 40 can be improved, and the cost and the time needed to manufacture the waveguide sheet 30 can be reduced by coating the auxiliary layer 100 only on the lower surface of the waveguide sheet 30 and by removing the first and the second auxiliary layers 110, 120 coated at the position 102 corresponding to the reflecting pattern 40.

In addition, with reference to FIG. 9, a fourth example of a light transmitting mechanism in an optical waveguide sheet according to the invention is more specifically described below.

Figure 9:
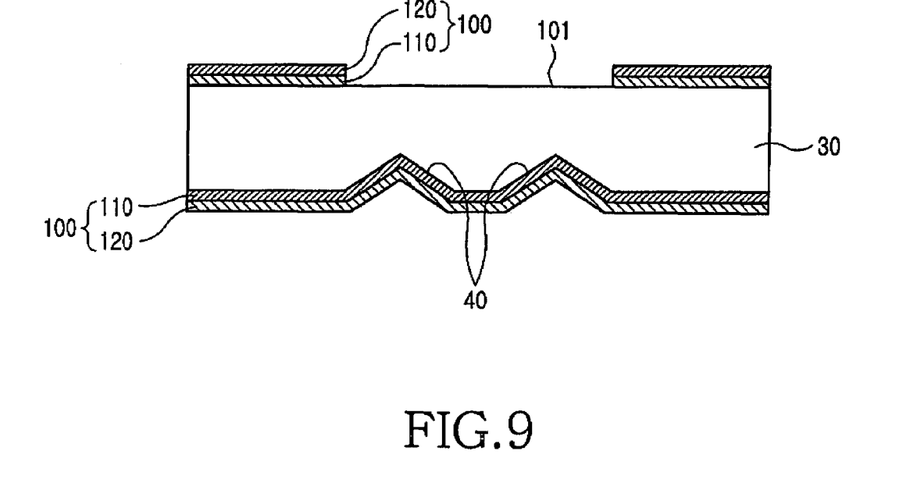
FIG. 9 is a cross sectional view of an optical waveguide sheet having auxiliary layers coated on an upper and a lower surfaces thereof according to a fourth embodiment of the invention, with a portion of the auxiliary layer corresponding to a transparent mark being removed.

In FIG. 9, an auxiliary layer 100 is coated on at least one of an upper and a lower surfaces of an optical waveguide sheet 30, such that a total reflection condition for preventing light A1 from leaking or being lost is provided during the time the light A1 is transmitted within the waveguide sheet 30, and the auxiliary layer 100 formed at a position 101 corresponding to a transparent mark 22 is removed.

The auxiliary layer 100 includes a first auxiliary layer 110 and a second auxiliary layer 120.

The auxiliary layer 100 is coated on the upper and the lower surfaces of the waveguide sheet 30, the auxiliary layer 100 coated at position 101 corresponding to the transparent mark 22 is removed, and then the waveguide sheet 30 is located below a keypad 20.

In this case, when a light emitting element 50 emits light A1, the light A1 is introduced into the waveguide sheet 30 and is transmitted therein.

The light A1 is reflected back into the waveguide sheet 30 on the upper and the lower boundary surfaces of the waveguide sheet 30 regardless of the incident angle of the light A1, thereby transmitting the light A1 within the waveguide sheet 30 without leak or loss of the light A1 at the upper and the lower boundary surfaces of the waveguide sheet 30.

In this case, the light A1 is reflected by the reflection pattern 40 formed on the backside of the waveguide sheet 30, then exits to a transparent mark 22 of a key 21 through the position 101 at which the auxiliary layer 100 has been removed.

Because of the auxiliary layer 100 coated on the upper and the lower surfaces of the waveguide sheet 30, leak or loss of the light A1 at the upper and the lower surfaces of the waveguide sheet 30 is prevented, thereby increasing brightness of the light at a distance from the light emitting element 50, uniformly transmitting the light A1 to the whole area of the keypad 20, and as a result, increasing the brightness of the light A1 introduced into the transparent mark 22.

In addition, only the auxiliary layer 100 coated at the position 101 corresponding to the transparent mark 22 is removed from the waveguide sheet 30, so the light A1 can exit from the waveguide sheet to the transparent mark 22.

In addition, with reference to FIG. 10, a fifth example of a light transmitting mechanism in an optical waveguide sheet according to the invention is more specifically described below.

Figure 10:
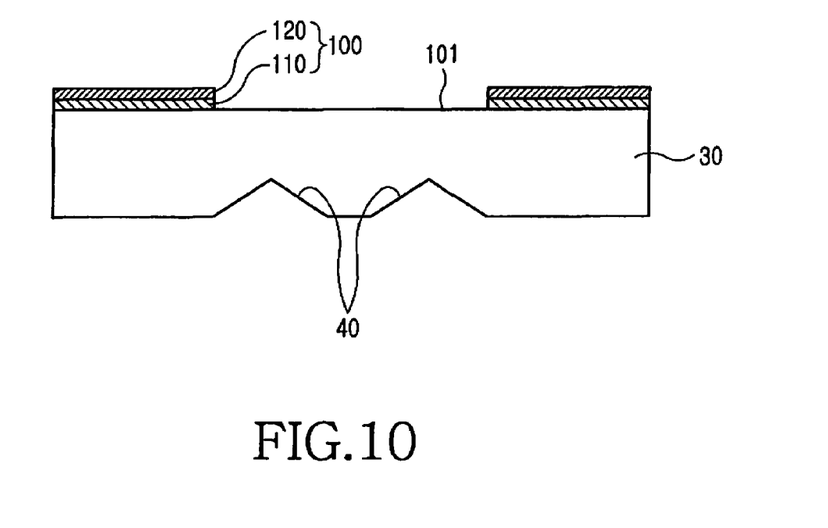
FIG. 10 is a cross sectional view of an optical waveguide sheet having auxiliary layer coated on upper surface thereof according to a fifth embodiment of the invention, with a portion of the auxiliary layers corresponding to a transparent mark being removed.

In FIG. 10, at least one auxiliary layer 100 is coated on an upper surface of an optical waveguide sheet 30, such that a total reflection condition for preventing light A1 from leaking or being lost is provided during the time the light A1 is transmitted within the waveguide sheet 30, and the auxiliary layer 100 formed at a position 101 corresponding to a transparent mark 22 is removed.

The auxiliary layer 100 includes a first auxiliary layer 110 and a second auxiliary layer 120.

The auxiliary layer 100 is coated only on the upper surface of the waveguide sheet 30, the auxiliary layer 100 coated at position 101 corresponding to the transparent mark 22 is removed, and then the waveguide sheet 30 is located below a keypad 20.

In this case, when a light emitting element 50 emits light A1, the light A1 is introduced into the waveguide sheet 30 and is transmitted therein.

The light A1 is reflected back into the waveguide sheet 30 on the upper boundary surface of the waveguide sheet 30 regardless of the incident angle of the light A1, thereby the light A1 being transmitted within the waveguide sheet 30 without leak or loss of the light A1 at the upper boundary surface of the waveguide sheet 30.

In this case, the light A1 is reflected by the reflection pattern 40 formed on the backside of the waveguide sheet 30, then exits to a transparent mark 22 of a key 21 through the position 101 at which the auxiliary layer 100 has been removed.

Because of the auxiliary layer 100 coated on the upper surface of the waveguide sheet 30, leak or loss of the light A1 at the upper surface of the waveguide sheet 30 is prevented, thereby increasing brightness of the light at a distance from the light emitting element 50, uniformly transmitting the light A1 to the whole area of the keypad 20, and as a result, increasing the brightness of the light A1 introduced into the transparent mark 22.

In addition, the light A1 can be transmitted to the transparent mark 22 easily, since the auxiliary layer 100 is coated only on the upper surface of the waveguide sheet 30 and is removed at the position 101 corresponding to the transparent mark 22.

In addition, with reference to FIG. 11, a sixth example of a light transmitting mechanism in an optical waveguide sheet according to the invention is more specifically described below.

Figure 11:
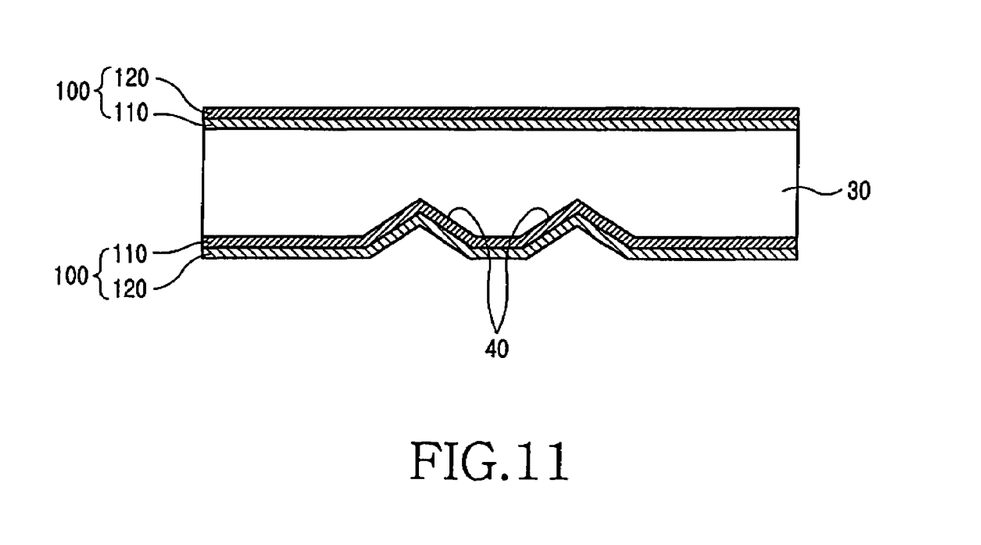
FIG. 11 is a cross sectional view of an optical waveguide sheet according to a sixth embodiment of the invention, the waveguide sheet having auxiliary layers on an upper and a lower surfaces thereof.

In FIG. 11, an auxiliary layer 100 is coated on at least one of upper and lower surfaces of an optical waveguide sheet 30, such that a total reflection condition for preventing light A1 from leaking or being lost is provided during the time the light A1 is transmitted within the waveguide sheet 30.

The auxiliary layer 100 includes a first auxiliary layer 110 and a second auxiliary layer 120.

In this case, when a light emitting element 50 emits light A1, the light A1 is introduced into the waveguide sheet 30 and is transmitted therein.

The light A1 is reflected back into the waveguide sheet 30 on the upper and the lower boundary surfaces of the waveguide sheet 30 regardless of the incident angle of the light A1, thereby transmitting the light A1 within the waveguide sheet 30 without leak or loss of the light A1 at the upper and the lower boundary surfaces of the waveguide sheet 30.

Because of the auxiliary layer 100 coated on the upper and the lower surfaces of the waveguide sheet 30, leak or loss of the light A1 at the upper and the lower surfaces of the waveguide sheet 30 is prevented, thereby providing substantially same brightness and intensity of light at any location of the waveguide sheet 30 as those of the light just emitted from the light emitting element 50.

Figure 12:
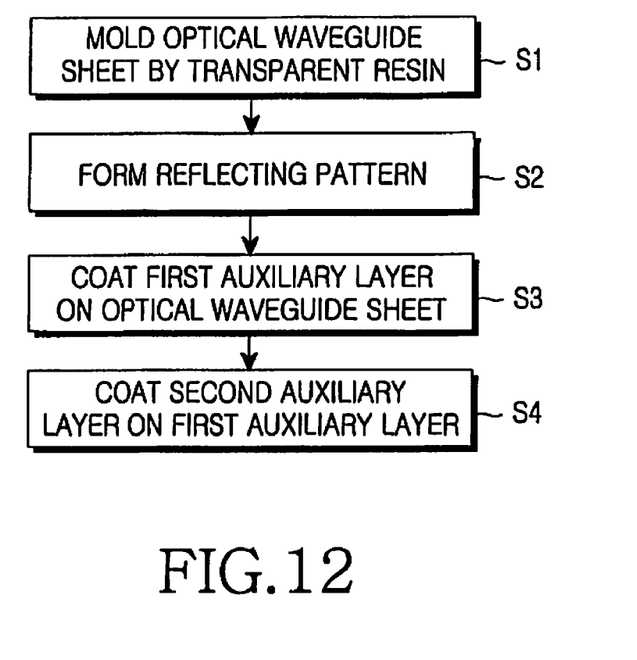
FIG. 12 is a flow chart illustrating a method of manufacturing an optical waveguide sheet according to the invention.

Referring to FIG. 12, a method for manufacturing the waveguide sheet as described above is specifically described below.

FIG. 12 shows a method for manufacturing an optical waveguide sheet 30 using a sheet from which a plurality of the waveguide sheets can be made into an optical waveguide sheet.

As shown in FIG. 12, the method for manufacturing the waveguide sheet includes a step of shaping transparent resin into an optical waveguide sheet 30, wherein the transparent resin includes, for example, polycarbonate, acryl resin, and polyethylene terephthalate (PET).

In step S2, a reflecting pattern 40 for reflecting light A1 traveling in the waveguide sheet 30 is formed on a side of the waveguide sheet 30 by laser beam machining or stamping.

In step S3, a first auxiliary layer 110 in a desired thickness is coated on the upper and the lower surfaces of the waveguide sheet 30 by vacuum deposition, so that a the total reflection condition for preventing light A1 from leaking or being lost through the upper and the lower boundary surfaces of the waveguide sheet is provided.

In step S4, a second auxiliary layer 120 in a desired color and at a desired thickness is coated on the surface of the first auxiliary layer 110 by printing, spraying, dipping, or the like, to protect the first auxiliary layer 110 and to increase reflectance to the light A1.

Then, the first and the second auxiliary layers 110, 120 coated at a position 102 corresponding to the reflecting pattern 40 and the first and second auxiliary layers 110, 120 coated at a position 101 corresponding to a transparent mark 22 are removed by etching or corrosion.

After removing of the first and the second auxiliary layers 110, 120 coated at the position 101 corresponding to the transparent mark 22 or the position corresponding to the reflecting pattern 40, a sheet from which a plurality of the waveguide sheets can be made is cut into each waveguide sheet 30 by pressing, and then the waveguide sheets 30 are trimmed for smoothing the cutting sides.

The first auxiliary layer 110 includes aluminum (Al), chrome (Cr), nickel (Ni), tin (Sn), silver (Ag), or titanium (Ti), or includes silicon dioxide ($SiO_2$), titanium oxide ($TiO_2$), or zirconium oxide ($ZrO_2$), and is coated on the upper and the lower surfaces of the waveguide sheet 30 by vacuum deposition.

The thickness, and thus the reflectance, of the first auxiliary layer 110, can be adjusted by selecting materials to be deposited and by controlling deposition time.

It is preferred to select materials that have high deposition efficiency and high reflectance, and to coat the materials in a minimal thickness which can provide a total reflection condition, so that leak and loss of light are extremely small.

The second auxiliary layer 120 in a desired color and at a desired thickness is coated on the surface of the first auxiliary layer 110 by printing, spraying, dipping, or the like.

By the above processes, the first and the second auxiliary layers 110, 120 for preventing the light A1 from being lost are coated on the waveguide sheet 30, as a result, the total reflection condition can be improved, so the light A1 is transmitted within the waveguide sheet 30 without loss.

In addition, with reference to FIG. 13, another example of a method for manufacturing waveguide sheet according to another embodiment of the invention is specifically described below.

Figure 13:
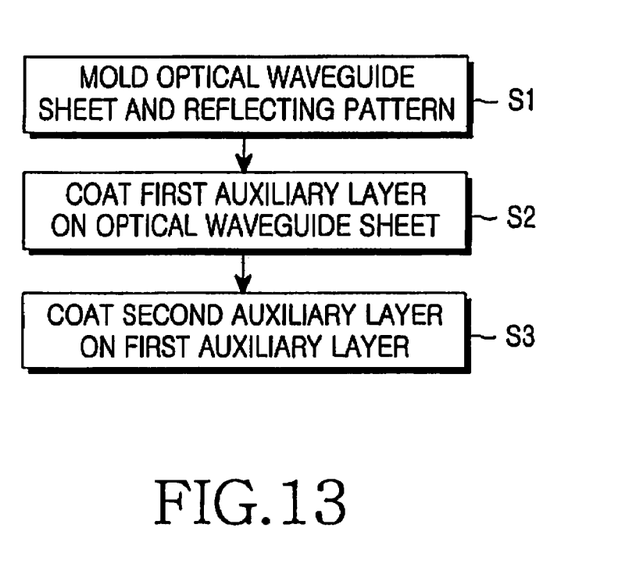
FIG. 13 is a flow chart illustrating a method of manufacturing an optical waveguide sheet by using injection molding according to the invention.

FIG. 13 shows a method for manufacturing waveguide sheet, the method including a step of injection molding of the waveguide sheet 30.

In FIG. 13, the method for manufacturing an optical waveguide sheet includes a step S1 of injection molding of transparent resin into an optical waveguide sheet 30 having a reflecting pattern 40 formed thereon, wherein the transparent resin includes, for example, polycarbonate, acryl resin, and polyethylene terephthalate (PET).

In step S2, a first auxiliary layer 110 in a desired thickness is coated on the upper and the lower surfaces of the waveguide sheet 30 by vacuum deposition, so that a total reflection condition for preventing light A1 from leaking or being lost through the upper and the lower boundary surfaces of the waveguide sheet is provided.

In step S3, a second auxiliary layer 120 in a desired color and at a desired thickness is coated on a surface of the first auxiliary layer 110 by printing, spraying, dipping, or the like, to protect the first auxiliary layer 110 and to increase reflectance to the light A1.

Further, the first and second auxiliary layers 110, 120 coated at a position 102 corresponding to the reflecting pattern 40 and the first and second auxiliary layers 110, 120 coated at a position 101 corresponding to a transparent mark 22 are removed by etching or corrosion.

The first auxiliary layer 110 includes aluminum (Al), chrome (Cr), nickel (Ni), tin (Sn), silver (Ag), titanium (Ti), or the like, or includes silicon dioxide ($SiO_2$), titanium oxide ($TiO_2$), zirconium oxide ($ZrO_2$), or the like.

It is preferred to select materials that have high deposition efficiency and high reflectance, and to coat the materials in a minimal thickness which can provide a total reflection condition, so that leak and loss of light are extremely small.

The second auxiliary layer 120 is coated on the surface of the first auxiliary layer 110 by printing, spraying, dipping, or the like. In addition, the second auxiliary layer 120 is coated on the surface of the first auxiliary layer 110 in a desired color and at a desired thickness, so a total reflection condition within the waveguide sheet 30 can be maximized by the first auxiliary layer 110.

By the above processes, the first and the second auxiliary layers 110, 120 for preventing the light A1 from being lost are coated on the waveguide sheet 30, as a result, the total reflection condition can be improved, so the light A1 is transmitted within the waveguide sheet 30 without loss.

The present invention can be applied to any device which uses an optical waveguide sheet.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An optical waveguide sheet for transmitting light from a light emitting element thereinto by total reflection, the waveguide sheet comprising:
   a reflecting pattern on a bottom surface of the waveguide sheet for reflecting the light towards an area of a top surface of the waveguide sheet located above the reflecting pattern; and
   at least one auxiliary layer for providing a total reflection condition for preventing the light from leaking or being lost when the light is transmitted into the waveguide sheet, the auxiliary layer being coated on at least one of the top and bottom surfaces of the waveguide sheet,
   wherein the auxiliary layer includes a first auxiliary layer coated on a surface of the waveguide sheet by vacuum deposition while being adjusted in thickness, and a second auxiliary layer coated on a surface of the first auxiliary layer to protect the first auxiliary layer and to increase a reflectance of the total reflection condition.

2. The waveguide sheet of claim 1, wherein the waveguide includes transparent resin.

3. The waveguide sheet of claim 2, wherein the transparent resin is made of any one selected from the group consisting of polycarbonate, acryl resin, and polyethylene terephthalate (PET).

4. The waveguide sheet of claim 1, wherein the first auxiliary layer is made of any one selected from the group consisting of aluminum (Al), chrome (Cr), nickel (Ni), tin (Sn), silver (Ag), and titanium (Ti).

5. The waveguide sheet of claim 1, wherein the first auxiliary layer is made of any one selected from the group consisting of silicon dioxide ($SiO_2$), titanium oxide ($TiO_2$), and zirconium oxide ($ZrO_2$).

6. The waveguide sheet of claim 1, wherein the second auxiliary layer is coated by printing, spraying or dipping.

7. The waveguide sheet of claim 1, wherein the first and the second auxiliary layers are coated on the top and bottom surfaces of the waveguide sheet.

8. The waveguide sheet of claim 1, wherein the first and the second auxiliary layers are removed in positions corresponding to the reflecting pattern and a transparent mark provided in the waveguide sheet.

9. An optical waveguide sheet for transmitting light from a light emitting element thereinto by total reflection, the waveguide sheet comprising:
   a reflecting pattern on a bottom surface of the waveguide sheet for reflecting the light towards an area of a top surface of the waveguide sheet located above the reflecting pattern; and
   at least one auxiliary layer for providing a total reflection condition for preventing the light from leaking or being lost when the light is transmitted into the waveguide sheet, the auxiliary layer being coated on the bottom surface of the waveguide sheet,
   wherein the auxiliary layer includes a first auxiliary layer coated on a surface of the waveguide sheet by vacuum deposition while being adjusted in thickness, and a second auxiliary layer coated on a surface of the first auxiliary layer to protect the first auxiliary layer and to increase a reflectance of the total reflection condition.

10. An optical waveguide sheet for transmitting light from a light emitting element thereinto by total reflection, the waveguide sheet comprising:
   a reflecting pattern on a bottom surface of the waveguide sheet for reflecting the light towards an area of a top surface of the waveguide sheet located above the reflecting pattern; and
   at least one auxiliary layer for providing a total reflection condition for preventing the light from leaking or being lost when the light is transmitted into the waveguide sheet, the auxiliary layer being coated on the bottom surface of the waveguide sheet,
   wherein the auxiliary layer is removed in a position corresponding to the reflecting pattern, and
   wherein the auxiliary layer includes a first auxiliary layer coated on a surface of the waveguide sheet by vacuum deposition while being adjusted in thickness, and a second auxiliary layer coated on a surface of the first auxiliary layer to protect the first auxiliary layer and to increase a reflectance of the total reflection condition.

11. An optical waveguide sheet for transmitting light from a light emitting element thereinto by total reflection, the waveguide sheet comprising:
   a reflecting pattern on a bottom surface of the waveguide sheet for reflecting the light towards an area of a top surface of the waveguide sheet located above the reflecting pattern; and
   at least one auxiliary layer for providing a total reflection condition for preventing the light from leaking or being lost when the light is transmitted into the waveguide sheet, the auxiliary layer being coated on the top and bottom surfaces of the waveguide sheet,
   wherein the auxiliary layer is removed in a position corresponding to a transparent mark provided in the waveguide sheet, and
   wherein the auxiliary layer includes a first auxiliary layer coated on a surface of the waveguide sheet by vacuum deposition while being adjusted in thickness, and a second auxiliary layer coated on a surface of the first auxiliary layer to protect the first auxiliary layer and to increase a reflectance of the total reflection condition.

12. An optical waveguide sheet for transmitting light from a light emitting element thereinto by total reflection, the waveguide sheet comprising:
   a reflecting pattern on a bottom surface of the waveguide sheet for reflecting the light towards an area of a top surface of the waveguide sheet located above the reflecting pattern; and
   at least one auxiliary layer for providing a total reflection condition for preventing the light from leaking or being lost when the light is transmitted into the waveguide sheet, the auxiliary layer being coated on the top surface of the waveguide sheet,
   wherein the auxiliary layer is removed in a position corresponding to a transparent mark provided in the waveguide sheet, and
   wherein the auxiliary layer includes a first auxiliary layer coated on a surface of the waveguide sheet by vacuum deposition while being adjusted in thickness, and a second auxiliary layer coated on a surface of the first auxiliary layer to protect the first auxiliary layer and to increase a reflectance of the total reflection condition.

13. An optical waveguide sheet for transmitting light from a light emitting element thereinto, the waveguide sheet comprising:

a reflecting pattern on a bottom surface of the waveguide sheet for reflecting the light forward towards an area of a top surface of the waveguide sheet located above the reflecting pattern; and at least one auxiliary layer for providing a total reflection condition for preventing the light from leaking or being lost when the light is transmitted into a side of the waveguide sheet, the auxiliary layer being coated on the top and bottom surfaces of the waveguide sheet, wherein the auxiliary layer includes a first auxiliary layer coated on a surface of the waveguide sheet by vacuum deposition while being adjusted in thickness, and a second auxiliary layer coated on a surface of the first auxiliary layer to protect the first auxiliary layer and to increase a reflectance of the total reflection condition.

14. A method of manufacturing an optical waveguide sheet for transmitting light from a light emitting element thereinto, which has a reflecting pattern on a bottom surface of the waveguide sheet for reflecting the light towards an area of a top surface of the waveguide sheet located above the reflecting pattern, the method comprising the steps of:

molding the waveguide sheet by using transparent resin;

forming the reflecting pattern in the waveguide sheet;

coating, by vacuum deposition while being adjusted in thickness, a first auxiliary layer for providing a total reflection condition for preventing light from leaking or being lost, on at least one of the top and bottom surfaces of the waveguide sheet; and coating a second auxiliary layer on a surface of the first auxiliary layer to protect the first auxiliary layer, increase the reflectance of the first auxiliary layer, and thus increase a reflectance of the total reflection condition of the first auxiliary layer.

15. The method of claim 14, wherein the transparent resin is made of any one selected from the group consisting of polycarbonate, acryl resin and polyethylene terephthalate (PET).

16. The method of claim 14, wherein the first auxiliary layer is coated on a surface of the waveguide sheet by vacuum deposition while being adjusted in thickness.

17. The method of claim 14, wherein the first auxiliary layer is made of any one selected from the group consisting of aluminum (Al), chrome (Cr), nickel (Ni), tin (Sn), silver (Ag), and titanium (Ti).

18. The method of claim 14, wherein the first auxiliary layer is made of any one selected from the group consisting of silicon dioxide ($SiO_2$), titanium oxide ($TiO_2$), and zirconium oxide ($ZrO_2$).

19. The method of claim 14, wherein the second auxiliary layer is coated by printing, spraying or dipping.

20. The method of claim 14, wherein the reflecting pattern is formed by laser beam machining or stamping.

21. The method of claim 14, further comprising the steps of:

cutting the waveguide sheet by pressing to thereby produce a plurality of the waveguide sheets after coating the first and the second auxiliary layers on the waveguide sheet; and trimming the cut waveguide sheets.

22. The method of claim 14, wherein, in the steps of coating the first and second auxiliary layers, the first and the second auxiliary layers are coated on the top and bottom surfaces of the waveguide sheet, and then removed in positions corresponding to the reflecting pattern and a transparent mark provided in the waveguide sheet.

23. A method of manufacturing an optical waveguide sheet for transmitting light from a light emitting element thereinto, which has a reflecting pattern on a bottom surface of the waveguide sheet for reflecting the light towards an area of a top surface of the waveguide sheet located above the reflecting pattern, the method comprising the steps of:

forming the reflecting pattern while injection molding transparent resin into the waveguide sheet;

coating, by vacuum deposition while being adjusted in thickness, a first auxiliary layer for providing a total reflection condition for preventing the light from leaking or being lost, on at least one of the top and bottom surfaces of the waveguide sheet; and coating a second auxiliary layer on a surface of the first auxiliary layer to protect the first auxiliary layer, increase the reflectance of the first auxiliary layer, and thus increase a reflectance of the total reflection condition of the first auxiliary layer.

24. The method of claim 23, wherein, in the steps of coating the first and second auxiliary layers, the first and the second auxiliary layers are coated on the top and bottom surfaces, and then removed in positions corresponding to the reflecting pattern and a transparent mark provided in the waveguide sheet.

* * * * *